United States Patent
Hara et al.

(10) Patent No.: US 7,921,458 B2
(45) Date of Patent: Apr. 5, 2011

(54) PACKET ROUTING METHOD, COMPUTER SYSTEM, AND COMPUTER PRODUCT

(75) Inventors: Masahiro Hara, Kawasaki (JP); Nami Nagata, Kawasaki (JP); Nobutsugu Fujino, Kawasaki (JP); Hideki Mitsunobu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 877 days.

(21) Appl. No.: 11/603,162

(22) Filed: Nov. 22, 2006

(65) Prior Publication Data

US 2007/0266432 A1 Nov. 15, 2007

(30) Foreign Application Priority Data

May 10, 2006 (JP) .................................. 2006-131875

(51) Int. Cl.
*G06F 15/16* (2006.01)
(52) U.S. Cl. ............. 726/15; 726/14; 713/153; 713/156
(58) Field of Classification Search ...................... 726/15
See application file for complete search history.

(56) References Cited

U.S. PATENT DOCUMENTS

| | | | |
|---|---|---|---|
| 6,515,974 B1* | 2/2003 | Inoue et al. ................... 370/331 |
| 2002/0191576 A1* | 12/2002 | Inoue et al. ................... 370/338 |
| 2003/0012179 A1* | 1/2003 | Yano et al. ................... 370/352 |
| 2003/0212907 A1* | 11/2003 | Genty et al. .................. 713/201 |
| 2004/0073642 A1* | 4/2004 | Iyer ............................... 709/223 |
| 2004/0136348 A1* | 7/2004 | Han .............................. 370/338 |
| 2004/0190529 A1* | 9/2004 | Hara ......................... 370/395.42 |
| 2005/0007995 A1* | 1/2005 | Inoue et al. ................... 370/349 |
| 2005/0105489 A1* | 5/2005 | Jee et al. ...................... 370/331 |
| 2005/0286531 A1* | 12/2005 | Tuohino et al. ............ 370/395.2 |
| 2006/0009266 A1* | 1/2006 | Hara et al. ................... 455/572 |
| 2006/0212937 A1* | 9/2006 | Natarajan ..................... 726/15 |
| 2007/0109998 A1* | 5/2007 | Hara et al. ................... 370/331 |
| 2007/0266432 A1* | 11/2007 | Hara et al. ................... 726/15 |

OTHER PUBLICATIONS

"Proposal of Shared Multilink Procedures Base on Moblie IP, Internet Protocol (IP)"by, Hidetoshi Muramatsu, Qiang Fu, Susumu Ishihara, and Tadanori Mizuno, paper presented at 64th National Conference of Information Processing Society of Japan (3), pp. 3-565 to 3-566, Mar. 2002.

* cited by examiner

*Primary Examiner* — Kambiz Zand
*Assistant Examiner* — Yonas Bayou
(74) *Attorney, Agent, or Firm* — Staas & Halsey LLP

(57) ABSTRACT

A gateway receives from a file server a packet addressed to another gateway in the same alliance, and transfers the packet to the other gateway. The gateway transmits a packet to the file server via another gateway in the same alliance. Upon receiving a packet from another gateway in the same alliance, the gateway transfers the packet to a PPTP server. The PPTP server transmits a packet received from the file server to a gateway via a different gateway in the same alliance.

22 Claims, 8 Drawing Sheets

FIG.4

| DESTINATION IP ADDRESS | DESTINATION NETMASK | SOURCE IP ADDRESS | SOURCE NETMASK | GATEWAY | INTERFACE | METRIC |
|---|---|---|---|---|---|---|
| GW-B (Remote) | 255.255.255.255 | RANDOM | 0.0.0.0 | GW-B (Local) | GW-B (Local) | * |
| GW-C (Remote) | 255.255.255.255 | RANDOM | 0.0.0.0 | GW-C (Local) | GW-C (Local) | * |
| ALLIANCE | DEPENDING ON ALLIANCE | RANDOM | 0.0.0.0 | GW-A (Local) | GW-A (Local) | * |
| DEFAULT | 0.0.0.0 | GW-A (Remote) | 255.255.255.255 | GW-B (Local) | GW-B (Local) | * |
| DEFAULT | 0.0.0.0 | GW-A (Remote) | 255.255.255.255 | GW-C (Local) | GW-C (Local) | * |
| DEFAULT | 0.0.0.0 | GW-A (Remote) | 255.255.255.255 | GW-A (Remote) | GW-A (Remote) | * |
| DEFAULT | 0.0.0.0 | OTHER THAN GW-A (Remote) | DEPENDING ON SOURCE | GW-A (Remote) | GW-A (Remote) | * |

FIG.5

| DESTINATION IP ADDRESS | DESTINATION NETMASK | SOURCE IP ADDRESS | SOURCE NETMASK | GATEWAY | INTERFACE | METRIC |
|---|---|---|---|---|---|---|
| GW-A (Remote) | 255.255.255.255 | RANDOM | 0.0.0.0 | GW-A (Local) | GW-A (Local) | * |
| GW-C (Remote) | 255.255.255.255 | RANDOM | 0.0.0.0 | GW-C (Local) | GW-C (Local) | * |
| ALLIANCE | DEPENDING ON ALLIANCE | RANDOM | 0.0.0.0 | GW-A (Local) | GW-A (Local) | * |
| DEFAULT | 0.0.0.0 | GW-B (Remote) | 255.255.255.255 | GW-A (Local) | GW-A (Local) | * |
| | | | | GW-C (Local) | GW-C (Local) | * |
| | | | | GW-B (Remote) | GW-B (Remote) | * |
| DEFAULT | 0.0.0.0 | OTHER THAN GW-A (Remote) | DEPENDING ON SOURCE | GW-B (Remote) | GW-B (Remote) | * |

FIG.6

| DESTINATION IP ADDRESS | DESTINATION NETMASK | SOURCE IP ADDRESS | SOURCE NETMASK | GATEWAY | INTERFACE | METRIC |
|---|---|---|---|---|---|---|
| ALLIANCE | DEPENDING ON ALLIANCE | NOT USED | NOT USED | GW-A (Remote) | GW-A (Remote) | * |
| | | | | GW-B (Remote) | GW-B (Remote) | * |
| | | | | GW-C (Remote) | GW-C (Remote) | * |
| DEFAULT | 0.0.0.0 | NOT USED | NOT USED | DEFAULT | DEFAULT | * |

PACKET ROUTING METHOD, COMPUTER SYSTEM, AND COMPUTER PRODUCT

BACKGROUND OF THE INVENTION

1. Field of the Invention

The present invention relates to a technology for routing a packet.

2. Description of the Related Art

As a network such as a Local Area Network (LAN) to connect multiple terminals, a wired LAN, which is constructed by using cables as transmission paths, are commonly used. Recently, however, networks that are constructed by using electromagnetic waves, instead of cables, as transmission paths are increasingly used. Public line networks of mobile phones and Personal Handyphone Systems (PHS) that can be remotely connected are examples of such networks.

The public line network does not require cables, which allow terminals to freely move and easy connection to the mobile terminals. However, the bandwidth of the public line network is smaller as compared to that of the wired LAN, and communication speed is slow.

To overcome the aforementioned drawback, a conventional technology is disclosed in "Provision of a communication line sharing system that uses a mobile Internet Protocol (IP)" by Hidetoshi Muramatsu, Qiang Fu, Susumu Ishihara, and Tadanori Mizuno, papers presented at 64th National Conference of Information Processing Society of Japan (3), pp. 3-565 to 3-566, Mar. 2002. In the conventional technology, based on Mobile IPv4 [RFC3344], a virtual path is formed with bandwidths used by other terminals nearby to connect to an external network, and bandwidth is secured by distribution and accumulation of packets at a Home Agent (HA). This allows a terminal to perform communication through a wider bandwidth path compared to when the terminal uses only its public line network.

However, the conventional technology requires IP tunneling based on mobile IP at the HA that carries out distribution and accumulation of packets in the upstream of the public line network as well as IP tunneling to transfer a packet to another terminal nearby. Such IP tunneling results in packet header overhead.

To be specific, when a terminal on a LAN transmits a packet via another terminal to a communication partner (hereinafter, "Correspondent Node (CN)") outside the LAN, the packet has to be encapsulated for IP tunneling based on mobile IP and also encapsulated for IP tunneling to transfer the packet from the terminal to the other terminal. That is, the packet is repeatedly encapsulated.

Sufficient regulations have not been established for security of mobile IP, and, for example, to ensure security of the VPN, further encapsulation is required for VPN IP-tunneling, which further increases packet header overhead. In other words, ensuring of security and reduction of packet header overhead are in a trade off relation.

SUMMARY OF THE INVENTION

It is an object of the present invention to at least partially solve the problems in the conventional technology.

According to an aspect of the present invention, computer system as a first terminal on a local area network (LAN) where the first terminal previously forms an alliance with a second terminal and is connected via a virtual private network (VPN) tunnel to a VPN server that is a gateway to an external network, includes a first transferring unit that transfers a packet addressed to the second terminal, which has been received from the external network, to the second terminal.

According to another aspect of the present invention, a computer system as a virtual private network (VPN) server that is connected via a VPN tunnel to a terminal on a local area network (LAN), where a first terminal previously forms an alliance with a second terminal, the VPN server being a gateway to an external network, includes a transferring unit that transfers a packet addressed to the first terminal, which has been received from the external network, to the second terminal.

According to still another aspect of the present invention, a packet routing method for a network including a local area network (LAN) where a first terminal previously forms an alliance with a second terminal and is connected via a virtual private network (VPN) tunnel to a VPN server that is a gateway to an external network, includes the first terminal receiving a packet addressed to the second terminal from the external network, and the first terminal transferring the packet to the second terminal.

According to still another aspect of the present invention, a packet routing method for a network including a local area network (LAN) where a first terminal previously forms an alliance with a second terminal and is connected via a virtual private network (VPN) tunnel to a VPN server that is a gateway to an external network, includes the VPN server receiving a packet addressed to the first terminal from the external network, and the VPN server transferring the packet to the second terminal.

According to still another aspect of the present invention, a computer-readable recording medium stores therein a computer program that causes a computer to implement the above methods.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of contents of a routing table of the gateway;

FIG. 5 is another example of contents of the routing table of the gateway;

FIG. 6 is an example of contents of a routing table of the PPTP server;

DETAILED DESCRIPTION OF THE PREFERRED EMBODIMENTS

Exemplary embodiments of the present invention are explained below with reference to the accompanying drawings. In the embodiments, the present invention is applied to an ad hoc network in which terminals connected to a wireless Local Area Network (LAN) communicate in an ad hoc mode. i.e., directly communicate with each other without using an access point. However, the present invention is not to be thus limited, and can be similarly applied to an infrastructure mode in which terminals communicate via an access point. Further, a wired LAN can also be used instead of the wireless LAN. Other VPN protocol can also be used instead of PPTP.

It is herein assumed that a VPN uses Point-to-Point Tunneling Protocol (PPTP) for tunneling Point-to-Point Protocol (PPP) frames in a network.

Figure 1:
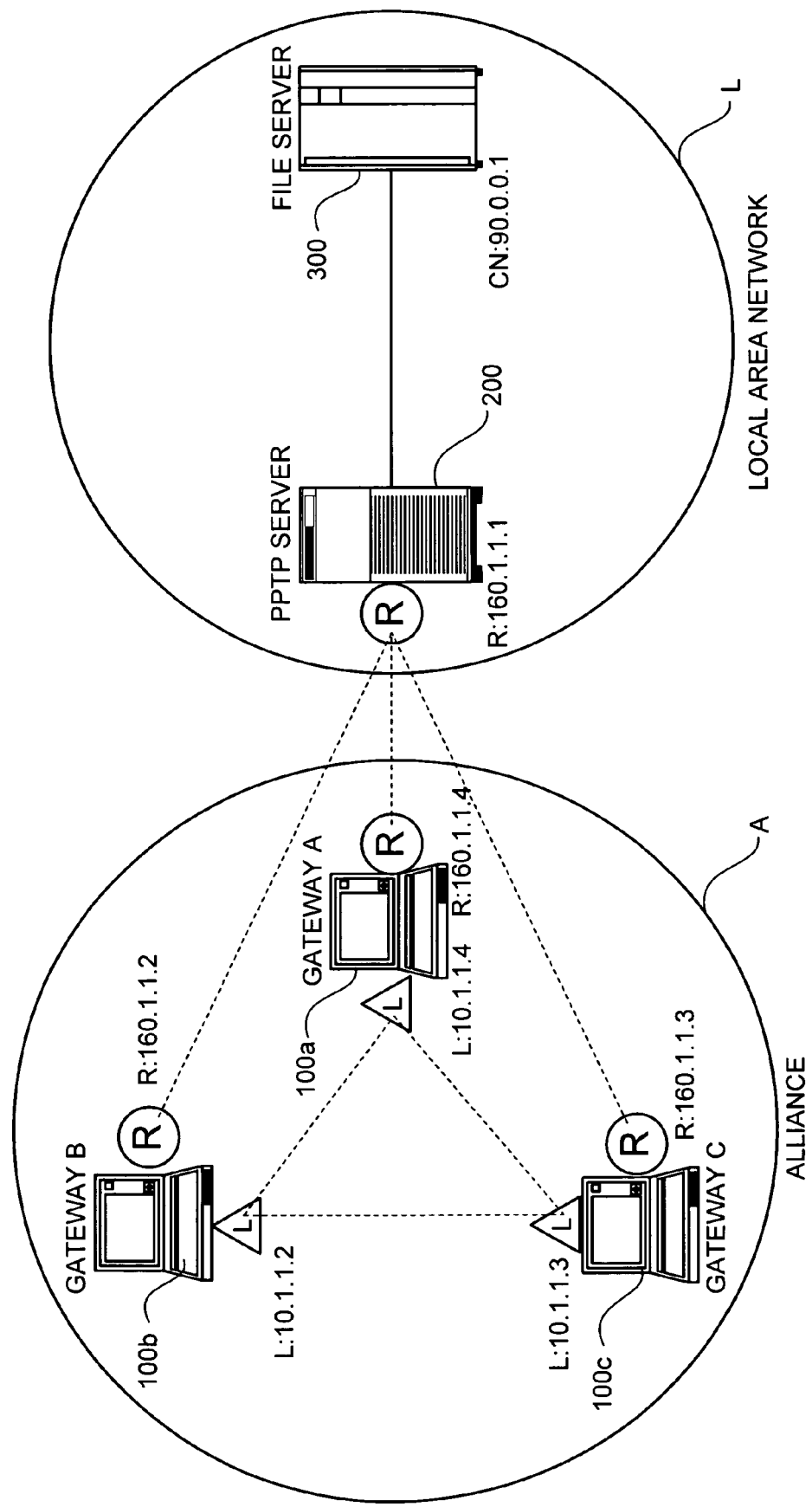
FIG. 1 is a schematic of a network structure according to an embodiment of the present invention.

FIG. 1 is a schematic of a network according to an embodiment of the present invention. The network includes an alliance A and a LAN L. The alliance A includes multiple gateways 100 (a gateway A 100a, a gateway B 100b, and a gateway C 100c). The LAN L includes a PPTP server 200, and a file server 300 as a CN.

In the network, all packets that are exchanged between the gateways 100 and the file server 300 always pass through the PPTP server 200 regardless of the path used. Thus, the PPTP server 200 functions as an upstream router of the gateways 100.

The alliance indicates herein a LAN that includes grouped terminals. In the embodiment, packet transfer is assigned beforehand to the respective gateways 100. Thus, the terminals create a group called alliance so that packets can be transferred within the group.

The gateway 100 which functions as an alliance leader multicasts an alliance construction request to the other gateways 100 on the same subnet. Upon receiving the alliance construction request, when agreeing to be a member of the alliance, the other gateways 100 send an acknowledgement to the alliance leader gateway 100. At this time, the gateways 100, which send the acknowledgement, set routing to complete preparation for transferring upload packets.

Then, the alliance leader notifies the PPTP server 200 of the alliance that is created between the alliance leader and alliance members. Upon receiving the notification, the PPTP server 200 sets routing thereof, thus completing preparation for transferring download packets.

By constructing the alliance, the gateway 100 that needs to carry out packet transfer is clearly identified, and therefore, how to set a routing table is clarified.

In the alliance A, local access is available for the gateways 100 by wireless communication. Local access is available for the PPTP server 200 and the file server 300 by wired communication. Remote access is available between the gateway A 100a and the PPTP server 200, the gateway B 100b and the PPTP server 200, and the gateway C 100c and the PPTP server 200.

Under the network structure, each of the gateways 100 is connected to a public line (for example, a Personal Handyphone System (PHS)) for remote access, and connected to a wireless LAN for local access. Each of the gateways 100 includes a public line interface as a communication device for connecting to the public line, and a wireless LAN interface as a communication device for connecting to the wireless LAN. The public line interface has a remote Internet Protocol (IP) address, and the wireless LAN interface has a local IP address.

To be specific, in the gateway A 100a, 160.1.1.4 is assigned to the public line interface as remote IP address for remote access, and 10.1.1.4 is assigned to the wireless LAN interface as local IP address for local access. In the gateway B 100b, remote IP address 160.1.1.2 is assigned to the public line interface, and local IP address 10.1.1.2 is assigned to the wireless LAN interface. In the gateway C 100c, remote IP address 160.1.1.3 is assigned to the public line interface, and local IP address 10.1.1.3 is assigned to the wireless LAN interface.

The PPTP server 200 is connected to the public line for remote access, and includes a public line interface as a communication device for connecting to the public line. Remote IP address 160.1.1.1 is assigned to the public line interface of the PPTP server 200. The file server 300 includes a communication interface as a communication device for remote access or global access. Global IP address or local IP address 90.0.0.1 is assigned to the communication interface of the file server 300.

The file server 300 need not always be connected to the LAN L, and can also be remotely connected. Further, a web server can also be used instead of the file server.

According to a conventional shared multipath procedure for a cluster network environment (SHAKE), a Home Agent (HA) is used as a substitute for the PPTP server 200, and multiple terminals are present under the HA. The terminals are connected by a short-distance high-speed network and information can be exchanged therebetween. The terminals can perform wireless communication with the HA using mobile IP.

Mobile IP allows packets to be routed to a destination terminal after the terminal has moved to a foreign network, regardless of the network where the terminal actually exists, even if the packets are sent to the same destination.

Generally, the terminal has a unique IP address called home address. When the terminal is present in a home network where the terminal is supposed to exist, packets addressed to the terminal are sent to the home address as a destination and arrive at the terminal.

However, if the terminal has moved to another network (generally called foreign network) than the home network, the terminal is assigned an IP address called care-of address that is valid in the foreign network, and the association between the home address and the care-of address is registered in the HA in the home network. By doing so, even if packets addressed to the terminal are sent to the home address as a destination, when the HA confirms that the destination terminal is not present in the home network, the packets are transferred to the terminal in the foreign network. To transfer the packets, the care-of address is used as an address of a transfer destination.

Accordingly, the terminal, which uses conventional mobile IP, has an identifier to treat the home address as the IP address of the terminal. In general, other terminals that intend to transmit data to the terminal send packets to the home address as the destination.

However, in the SHAKE, which uses mobile IP to virtually and logically combine bandwidths of other terminals nearby to obtain a wider bandwidth, in addition to encapsulation of packets for mobile IP, encapsulation of packets is required with respect to each destination terminal. Thus, transmission of packets to the destination terminal via another terminal using the SHAKE results in repeated encapsulation of packets and packet header overhead.

There is no regulation related to security for mobile IP, and additional security such as VPN results in encapsulation of VPN packets and an increase in packet header overload. Thus, although the SHAKE is aimed at expanding the bandwidth and enhancing the communication speed, enhancement of the communication speed is suppressed due to the packet header overhead.

To overcome such a drawback, in the embodiment, the PPTP server 200 is used instead of the HA, and each of the gateways 100 in the alliance A and the PPTP server 200 perform packet routing. Thus, packets can be transmitted to the destination terminal without encapsulation for specifying the transfer destination terminal.

Further, because the PPTP server 200 is used as a gateway of the wireless LAN, security can be enhanced by using the VPN for the communication between each of the gateways 100 and the PPTP server 200.

Figure 2:
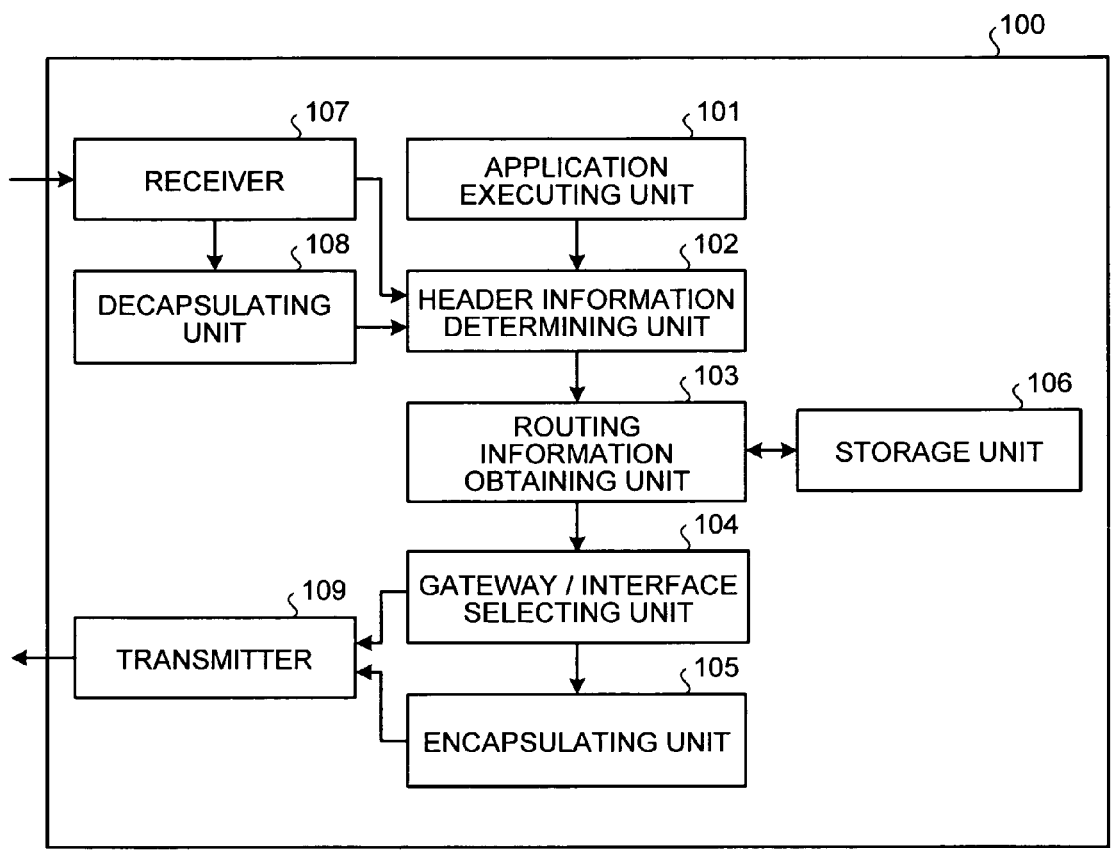
FIG. 2 is a functional block diagram of a gateway shown in FIG. 1.

FIG. 2 is a functional block diagram of the gateway 100. The gateways 100 include an application executing, unit 101, a header information determining unit 102, a routing information obtaining unit 103, a gateway/interface selecting unit 104, an encapsulating unit 105, a storage unit 106, a receiver 107, a decapsulating unit 108, and a transmitter 109.

The application executing unit 101 executes an application to output a transmission packet. The transmission packet includes a local IP address, a remote IP address or a global IP address that indicates a destination of the packet. The transmission packet output from the application executing unit 101 is sent to the header information determining unit 102.

The header information determining unit 102 refers to header information of the transmission packet from the application executing unit 101, a packet received by the receiver 107 from the other gateway 100 participating in the same alliance A, or a packet received from the PPTP server 200 sent from the decapsulating unit 108, and obtains a destination IP address. Based on the destination IP address, the header information determining unit 102 determines whether the packet is addressed thereto. If the packet is addressed thereto, the header information determining unit 102 does not transfer the packet and holds the packet. Further, the header information determining unit 102 determines whether the packet is a VPN encapsulated packet received from the PPTP server 200.

Based on the packet and the destination IP address from the header information determining unit 102, the routing information obtaining unit 103 refers to the storage unit 106 and obtains routing information of the destination.

Based on the packet and the routing information from the routing information obtaining unit 103, the gateway/interface selecting unit 104 selects a gateway and an interface. If the selected gateway and the interface are towards the PPTP server 200, the gateway/interface selecting unit 104 sends the packet to the encapsulating unit 105. If the selected gateway and the interface are towards the other gateway 100, the gateway/interface selecting unit 104 sends the packet to the transmitter 109.

The encapsulating unit 105 VPN-encapsulates the packet from the gateway/interface selecting unit 104, and sends the VPN encapsulated packet to the transmitter 109.

The receiver 107 is an interface to receive packets from the other gateways 100 or the PPTP server 200. Having received a packet from the other gateway 100, the receiver 107 sends the packet to the header information determining unit 102. Having received a packet from the PPTP server 200, the receiver 107 sends the packet to the decapsulating unit 108.

The decapsulating unit 108 decapsulates the VPN encapsulated packet, and sends the decapsulated packet to the header information determining unit 102.

The transmitter 109 is an interface to transmit packets to the other gateways 100 or the PPTP server 200.

Figure 3:
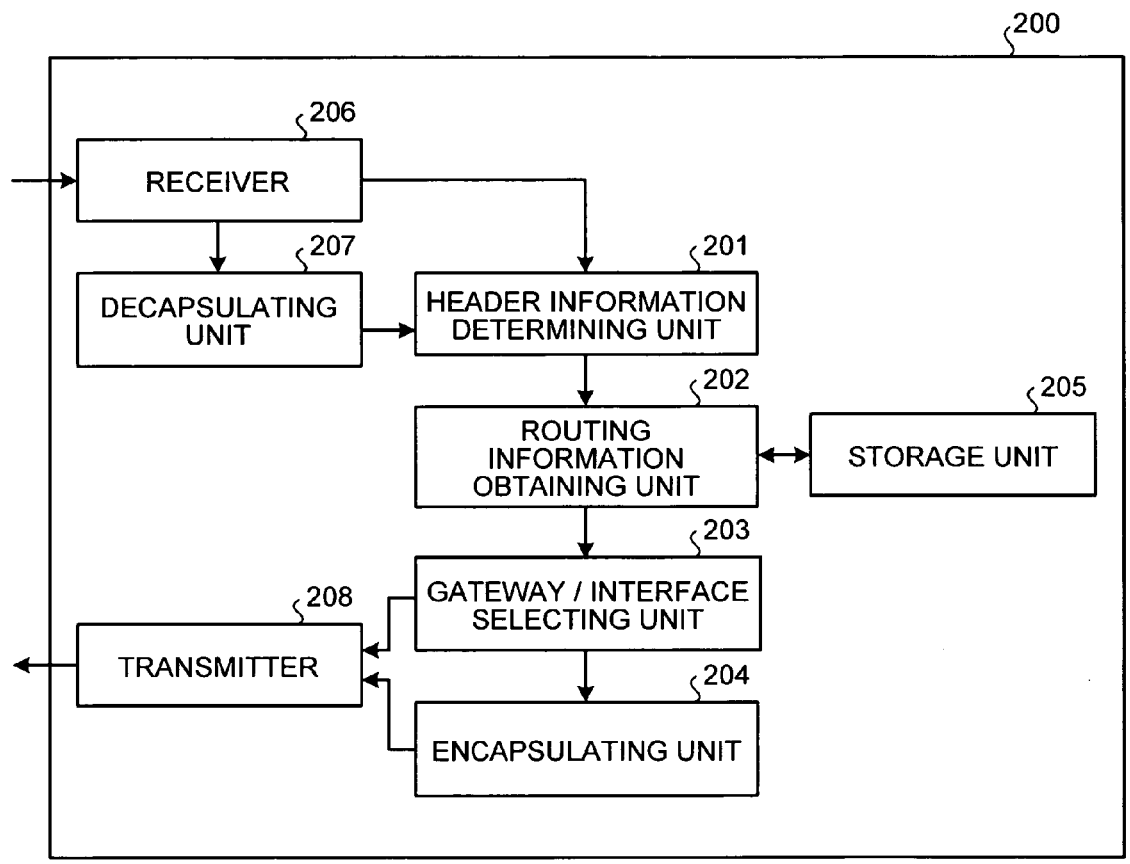
FIG. 3 is a functional block diagram of a PPTP server shown in FIG. 1.

FIG. 3 is a functional block diagram of the PPTP server 200. The PPTP server 200 includes a header information determining unit 201, a routing information obtaining unit 202, a gateway/interface selecting unit 203, an encapsulating unit 204, a storage unit 205, a receiver 206, a decapsulating unit 207, and a transmitter 208.

The header information determining unit 201 refers to header information of a packet received by receiver 206 from the file server 300, or a packet received from the other gateway 100 sent from the decapsulating unit 207, and obtains a destination IP address. The header information determining unit 201 determines whether the packet is a VPN encapsulated packet received from the gateway 100.

Based on the packet and the destination IP address from the header information determining unit 201, the routing information obtaining unit 202 refers to the storage unit 205 and obtains routing information of the destination.

Based on the packet and the routing information from the routing information obtaining unit 202, the gateway/interface selecting unit 203 selects a gateway and an interface. If the selected gateway and the interface are towards the gateway 100, the gateway/interface selecting unit 203 sends the packet to the encapsulating unit 204. If the selected gateway and the interface are towards the file server 300, the gateway/interface selecting unit 203 sends the packet to the transmitter 208.

The encapsulating unit 204 VPN-encapsulates the packet from the gateway/interface selecting unit 203, and sends the VPN encapsulated packet to the transmitter 208.

The receiver 206 is an interface to receive packets from the gateways 100 or the file server 300. Having received a packet from the gateway 100, the receiver 206 sends the packet to the decapsulating unit 207. Having received a packet from the file server 300, the receiver 206 sends the packet to the header information determining unit 201.

The decapsulating unit 207 decapsulates the VPN encapsulated packet, and sends the decapsulated packet to the header information determining unit 201.

The transmitter 208 is an interface to transmit packets to the gateways 100 or the file server 300.

FIG. 4 is an example of contents of a routing table stored in the storage unit 106. Specifically, FIG. 4 is the table image of the routing table stored in the storage unit 106 of the gateway A 100a.

The routing table contains columns of destination IP address, destination netmask, source IP address, source netmask, gateway, interface, and metric.

The destination IP address indicates the IP address of the destination gateway 100 or the file server 300. The IP address includes a local IP address, a remote IP address, and a global IP address. Thus, apart from a local IP address, a remote IP address or a global IP address can also be registered as the destination IP address, and a Media Access Control (MAC) address can be obtained by using an Address Resolution Protocol (ARP). Therefore, even if a destination does not exist in the alliance, the MAC address can be returned to a source and packet transfer at a MAC frame level is enabled even if the destination IP address is outside the alliance.

The destination netmask is used to, when the destination IP address is the global IP address or the remote IP address, define which part of the IP address is the subnet address and which is the host address. The subnet address is the IP address for identifying a LAN connected to the destination terminal that is specified by the destination IP address. The host address is the IP address for identifying the destination terminal connected to the LAN.

The source IP address is the IP address of the source gateway 100 or the file server 300. The source IP address includes a local IP address, a remote IP address, or a global IP address.

The source netmask is used to, when the source IP address is the global IP address or the remote IP address, define which part of the IP address is the subnet address.

The gateway is information that indicates the transfer destination gateway 100 corresponding to each destination IP address. The interface is information that indicates the IP address or a network device to which a packet is to be sent so that the packet arrives at each gateway. The metric is information that indicates network costs for transmitting a packet to the terminal specified by the destination IP address.

Among the records shown in FIG. 4, those in the two upper rows, i.e., records (entries) with the destination IP address GW-B (Remote) and GW-C (Remote) are routing information corresponding to packets received from outside the alliance A.

Among the records shown in FIG. 4, the record with the destination IP address "alliance" is routing information corresponding to packets exchanged inside the alliance A. In this case, the destination netmask depends on the alliance A.

Among the records shown in FIG. 4, those in the two lower rows, i.e., records with the destination IP address "default" are routing information corresponding to packets to be transmitted to outside the alliance A. According to the routing information, packets (upload packets) that are transmitted from one of the gateways 100 in the alliance A to the outside are distributed to the other gateways 100 in the alliance A, and transferred to the PPTP server 200.

According to the routing information shown in FIG. 4, for example, if a packet received from the PPTP server 200 is addressed to the gateway B 100b, the routing information obtaining unit 103 refers to the row indicating the destination IP address GW-B (Remote), and obtains information such as the destination netmask 255.255.255.255, the source IP address "random", the source netmask 0.0.0.0, the gateway GW-B (Local), and the interface GW-B (Local).

The destination netmask 255.255.255.255 indicates that all bits of the IP address GW-B (Remote) are equal to those of the subnet address. The source IP address "random" and the source netmask 0.0.0.0 indicates that the routing information is not related to the source IP address and the subnet mask of the source does not make any difference.

The gateway GW-B (Local) and the interface GW-B (Local) indicate that, if the destination IP address is GW-B (Remote), the gateway B 100b is selected as the transfer destination of the packet.

In other words, a packet received from outside the alliance A and addressed to GW-B (Remote) is transferred to the gateway B 100b that is connected to the alliance A as a host computer.

Further, according to the routing information shown in FIG. 4, for example, if a packet transmitted from the gateway A 100a is addressed to outside the alliance A, the routing information obtaining unit 103 refers to the row indicating the destination IP address "default" and the source IP address GW-A (Remote), and obtains information such as the destination netmask 0.0.0.0, the source netmask 255.255.255.255, the gateway GW-B (Local), GW-C (Local) or GW-A (Remote), and the interface GW-B (Local), GW-C (Local) or GW-A (Remote).

The destination netmask 0.0.0.0 indicates that all bits of the IP address "default" are equal to those of the host address. The source netmask 255.255.255.255 indicates that all the bits of the source IP address are the subnet address.

The gateway and the interface GW-B (Local), GW-C (Local) or GW-A (Remote) indicates that, if the destination IP address is "default", the packet is transmitted directly from the gateway A 100a to the PPTP server 200, or transferred to the gateway B 100b or the gateway C 100c.

In other words, a packet transmitted to outside the alliance A is transferred to the gateway B 100b or the gateway C 100c that are connected to the alliance A as host computers, or the packet is transmitted directly from the gateway A 100a to the PPTP server 200.

In the case of transmitting a packet from the gateway A 100a to outside the alliance A, the source IP address GW-A (Remote) is added to header information of the packet. This prevents unnecessary routing of the packet, as in, for example, the packet is retransferred from the transfer destination gateway 100 to the source.

As described above, when a packet is transmitted from the gateway A 100a to outside the alliance A, a gateway or an interface can be selected from one of them. If a packet can be transmitted to the PPTP server 200 via the gateway B 100b or the gateway C 100c, a greater bandwidth of the transmission path can be ensured compared to when the packet is transmitted directly from the gateway A 100a to the PPTP server 200. Thus, packet congestion on the transmission path can be prevented and the communication speed can be enhanced.

If multiple gateways and interfaces correspond to a single destination IP address, a gateway and an interface is selected based on a uniform random number, a random number weighted according to the bandwidth, a random number weighted according to the bandwidth and communication delay, or the gateway with the least network traffic.

FIG. 5 is another example of contents of the routing table stored in the storage unit 106. Specifically, FIG. 5 is the table image of the routing table stored in the storage unit 106 of the gateway B 100b. The routing table is basically similar to that of FIG. 4 and contains columns having the same functions as those of the columns shown in FIG. 4.

Among the records shown in FIG. 5, those in the two upper rows, i.e., records with the destination IP address GW-A (Remote) and GW-C (Remote) are routing information corresponding to packets received from outside the alliance A.

Among the records shown in FIG. 5, the record with the destination IP address "alliance" is routing information corresponding to packets exchanged inside the alliance A. In this case, the destination netmask depends on the alliance A.

Among the records shown in FIG. 5, those in the two lower rows, i.e., records with the destination IP address "default" are routing information corresponding to packets to be transmitted to outside the alliance A.

According to the routing information shown in FIG. 5, for example, if a packet received from the PPTP server 200 is addressed to the gateway A 100a, the routing information obtaining unit 103 refers to the row indicating the destination IP address GW-A (Remote), and obtains information such as the destination netmask 255.255.255.255, the source IP address "random", the source netmask 0.0.0.0, the gateway GW-A (Local), and the interface GW-A (Local).

The destination netmask 255.255.255.255 indicates that all bits of the IP address GW-A (Remote) are equal to those of the subnet address. The source IP address "random" and the source netmask 0.0.0.0 indicates that the routing information is not related to the source IP address and the subnet mask of the source does not make any difference.

The gateway GW-A (Local) and the interface GW-A (Local) indicate that, if the destination IP address is GW-A (Remote), the gateway A 100a is selected as the transfer destination of the packet.

In other words, a packet received from outside the alliance A and addressed to GW-A (Remote) is transferred to the gateway A 100a that is connected to the alliance A as a host computer.

Further, according to the routing information shown in FIG. 5, for example, if a packet transmitted from the gateway B 100b is addressed to outside the alliance A, the routing information obtaining unit 103 refers to the row indicating the destination IP address "default" and the source IP address GW-B (Remote), and obtains information such as the destination netmask 0.0.0.0, the source netmask 255.255.255.255, the gateway GW-A (Local), GW-C (Local) or GW-B (Remote), and the interface GW-A (Local), GW-C (Local) or GW-B (Remote).

The gateway and the interface GW-A (Local), GW-C (Local) or GW-B (Remote) indicates that, if the destination IP address is "default", the packet is transmitted directly from the gateway B 100*b* to the PPTP server 200, or transferred to the gateway A 100*a* or the gateway C 100*c*.

In other words, a packet transmitted to outside the alliance A is transferred to the gateway A 100*a* or the gateway C 100*c* that are connected to the alliance A as host computers, or the packet is transmitted directly from the gateway B 100*b* to the PPTP server 200.

The routing table stored in the storage unit 106 of the gateway C 100*c* is basically similar to the routing table of the gateway A 100*a* and the gateway B 100*b*, and the same explanation is not repeated.

FIG. 6 is an example of contents of a routing table stored in the storage unit 205. The routing table is basically similar to those previously described in connection with FIGS. 4 and 5, and contains columns having the same functions. The routing table in the storage unit 205 does not contain the columns of the source IP address and the source netmask.

Among the records shown in FIG. 6, the record in the upper row, i.e., record with the destination IP address "alliance" is routing information corresponding to a packet to be transmitted to the alliance A. In this case, the destination netmask depends on the alliance A. According to the routing information, packets (download packets) that are transmitted from outside the alliance A to one of the gateways 100 in the alliance A are distributed to the other gateways 100 in the alliance A, and transferred to the one of the gateways 100.

Among the records shown in FIG. 6, the record in the lower row, i.e., record with the destination IP address "default" is routing information corresponding to packets to be transmitted to the LAN L.

According to the routing information shown in FIG. 6, for example, if a packet transmitted from the PPTP server 200 is addressed to the alliance A, the routing information obtaining unit 202 refers to the row indicating the destination IP address "alliance", and obtains information such as the gateway GW-A (Remote), GW-B (Remote) or GW-C (Remote), and the interface GW-A (Remote), GW-B (Remote) or GW-C (Remote).

The gateway and the interface GW-A (Remote), GW-B (Remote) or GW-C (Remote) indicate that, if the destination IP address is "alliance", the packet is transmitted from the PPTP server 200 to the gateway A 100*a*, the gateway B 100*b*, or the gateway C 100*c*.

In other words, a packet transmitted to the alliance A is transmitted directly to the gateway A 100*a*, the gateway B 100*b* or the gateway C 100*c* that are connected to the alliance A as remote computers.

According to the routing information shown in FIG. 6, for example, if a packet transmitted from the PPTP server 200 is addressed to the file server 300, the routing information obtaining unit 202 refers to the row indicating the destination IP address "default", and obtains information such as the destination netmask 0.0.0.0, and the gateway and the interface "default".

The gateway and the interface "default" indicates that, if the destination IP address is "default", the specified destination of the packet, i.e., the IP address of the file server 300, is selected by default.

In other words, a packet received from the alliance A and addressed to the file server 300 is transmitted to the file server 300.

Figure 7:
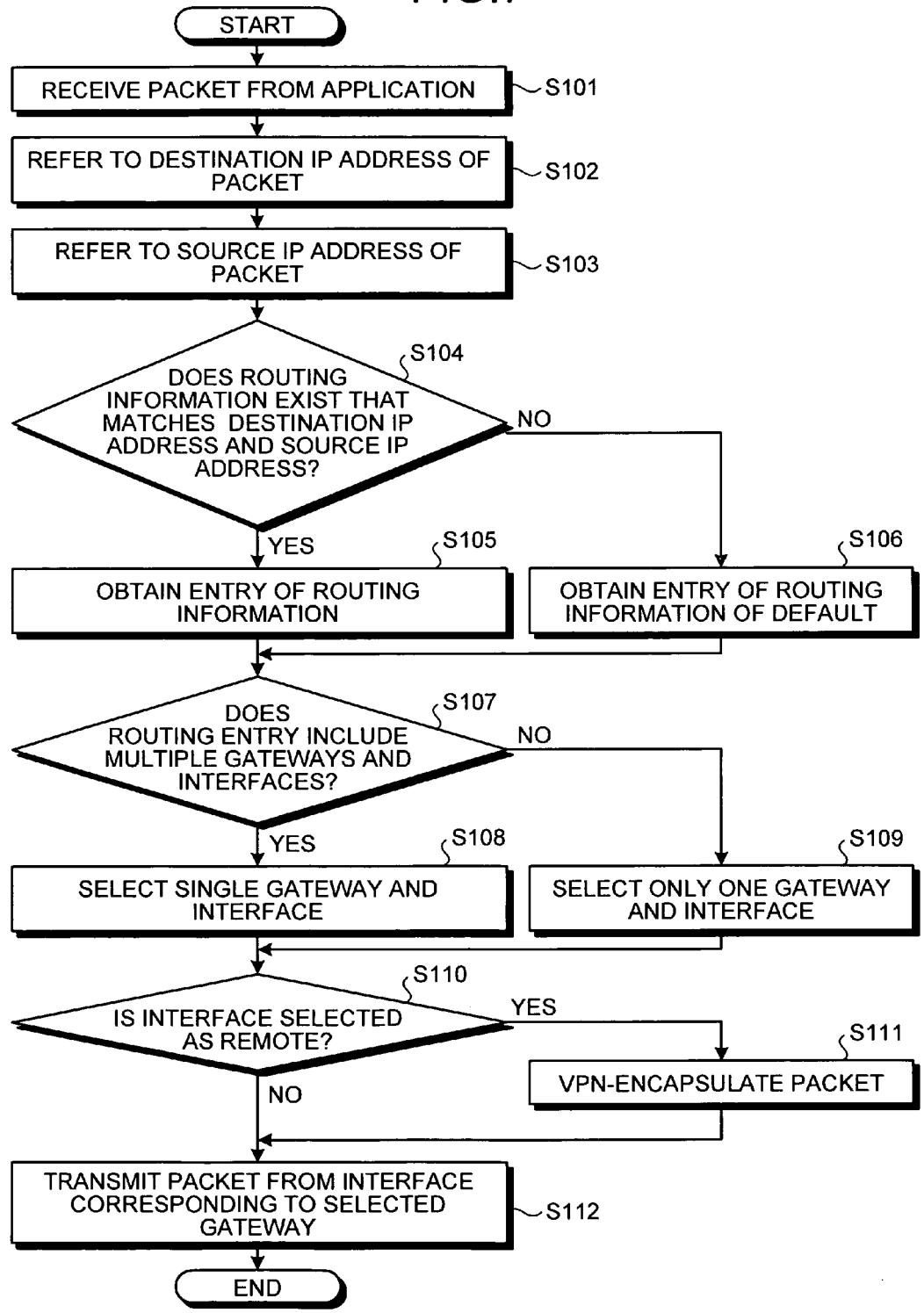
FIG. 7 is a flowchart of a packet transmitting process.

FIG. 7 is a flowchart of a packet transmitting process performed by the gateway 100. First, the gateway 100 receives a packet from an application (step S101). The gateway 100 refers to the destination IP address of the packet (step S102), and also refers to the source IP address thereof (step S103).

Next, the gateway 100 determines whether routing information exists that matches the destination IP address and the source IP address (step S104). If such routing information exists (Yes at step S104), the process proceeds to step S105. If not (No at step S104), the process proceeds to step S106.

The gateway 100 obtains the entry (record) of the routing information (step S105), and the process proceeds to step S107. On the other hand, the gateway 100 obtains the entry of default routing information (step S106), and the process proceeds to step S107.

The gateway 100 determines whether the routing entry includes multiple gateways and interfaces (step S107). If the routing entry includes multiple gateways and interfaces (Yes at step S107), the gateway 100 selects a single gateway and an interface (step S108). If not (No at step S107), the gateway 100 selects the only one gateway and the interface (step S109).

Next, the gateway 100 determines whether the selected interface is Remote indicating a remote host (step S110). If the selected interface is Remote (Yes at step S110), the gateway 100 VPN-encapsulates the packet (step S111). If the selected interface is not Remote (No at step S110), the gateway 100 transmits the packet from the interface corresponding to the selected gateway (step S112).

Figure 8:
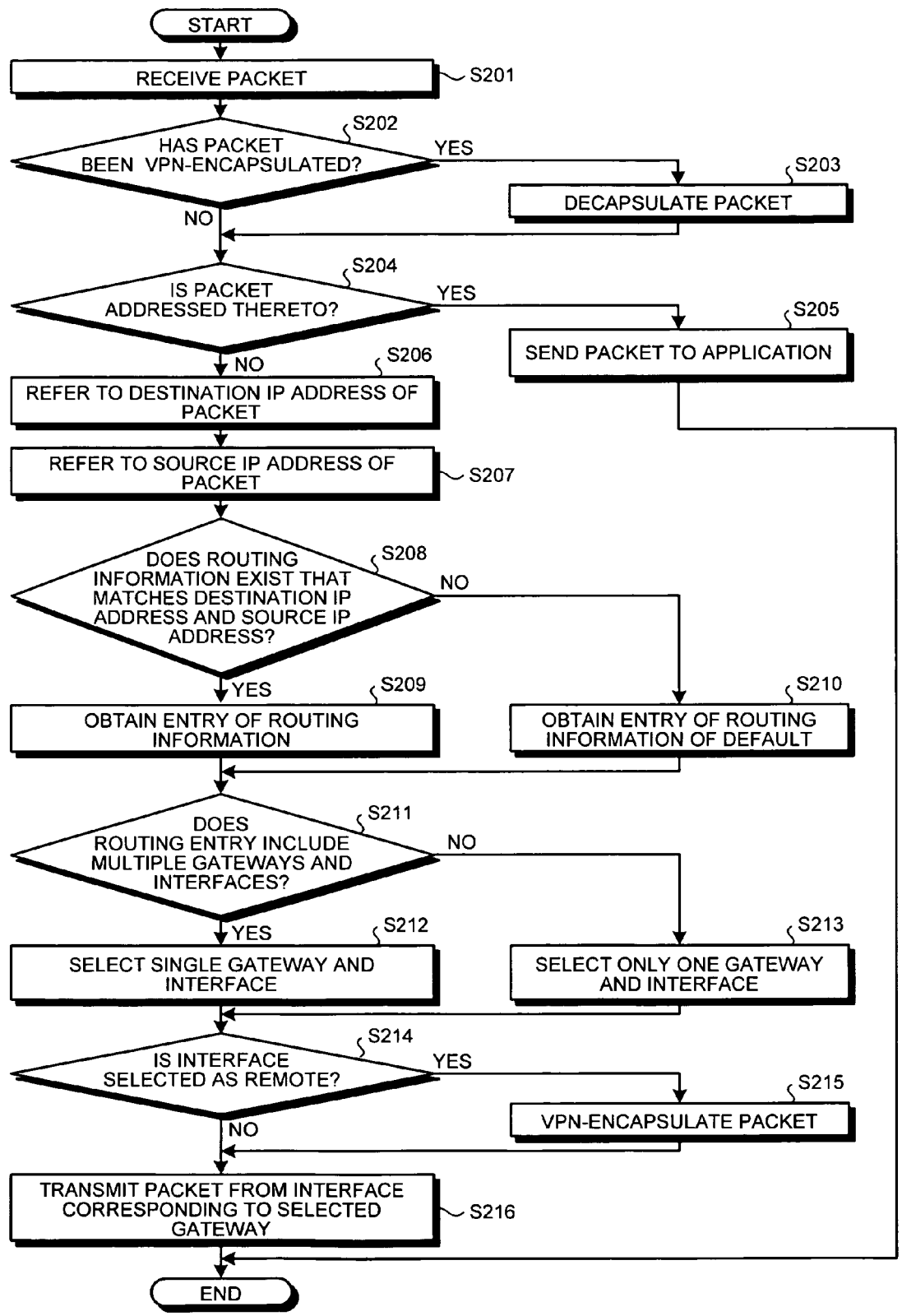
FIG. 8 is a flowchart of a packet receiving process.

FIG. 8 is a flowchart of a packet receiving process performed by the gateway 100 or the PPTP server 200. First the gateway 100 or the PPTP server 200 receives a packet (step S201). Next, the gateway 100 or the PPTP server 200 determines whether the packet is a VPN encapsulated packet (step S202). If the packet is the VPN encapsulated packet (Yes at step S202), the gateway 100 or the PPTP server 200 decapsulates the packet (step S203), and the process proceeds to step S204. If the packet is not the VPN encapsulated packet (No at step S202), the process proceeds to step S204.

The gateway 100 or the PPTP server 200 determines whether the packet is addressed thereto (step S204). If the packet is addressed thereto (Yes at step S204), the process proceeds to step S205. If not (No at step S204), the process proceeds to step S206. The packet is sent to the application (step S205), and the process ends.

The gateway 100 or the PPTP server 200 refers to the destination IP address of the packet (step S206), and also refers to the source IP address of the packet (step S207).

Next, the gateway 100 or the PPTP server 200 determines whether routing information exists that matches the destination IP address and the source IP address (step S208). If such routing information exists (Yes at step S208), the process proceeds to step S209. If not (No at step S208), the process proceeds to step S210.

The gateway 100 or the PPTP server 200 obtains the entry of the routing information (step S209), and the process proceeds to step S211. On the other hand, the gateway 100 or the PPTP server 200 obtains the entry of default routing information (step S210), and the process proceeds to step S211.

The gateway 100 or the PPTP server 200 determines whether the routing entry includes multiple gateways and interfaces (step S211). If the routing entry includes multiple gateways and interfaces (Yes at step S211), the gateway 100 or the PPTP server 200 selects a single gateway and an interface (step S212). If not (No at step S211), the gateway 100 or the PPTP server 200 selects the only one gateway and the interface (step S213).

Next, the gateway 100 or the PPTP server 200 determines whether the selected interface is Remote indicating a remote host (step S214). If the selected interface is Remote (Yes at step S214), the gateway 100 or the PPTP server 200 VPN-encapsulates the packet (step S215). If the selected interface is not Remote (No at step S214), the gateway 100 or the PPTP server 200 transmits the packet from the interface corresponding to the selected gateway (step S216).

According to the embodiment, because an expanded routing function is used, the number of times of IP encapsulation is reduced. Besides, by using the PPTP server 200, the VPN structure of the PPTP server 200 can be used, and security can be easily enhanced by encryption.

A computer program can be executed on a computer system, such as a personal computer, a server and a workstation, to realize the various processes explained in the embodiment. A Unix (registered trademark)-based or Linux (registered trademark)-based program is executed by routing daemon.

As set forth hereinabove, according to an embodiment of the present invention, a terminal is on a LAN in which the terminal previously forms an alliance with another terminal and is connected via a VPN tunnel to a VPN server that is a gateway to an external network. Having received a packet from the external network to the other terminal, the terminal routes the packet to the destination. When the terminal transmits a packet to the external network, the packet is routed to the destination via the other terminal. Upon receiving a packet from the other terminal, the terminal routes the packet to the destination via the VPN server. Thus, the number of times of IP encapsulation can be reduced to a necessary minimum, and a logical band of a network can be secured while packet header overhead is suppressed. Further, the use of VPN enhances the security of the network.

Moreover, when transferring a packet received from the other terminal or the VPN server to the VPN server or a terminal, the terminal refers to a routing table that contains columns of a source IP address and a source netmask. Based on source information, the terminal can determine whether to route the packet inside the LAN or rout the packet to the external network. Thus, unnecessary transfer of a packet, such as returning a packet to a source terminal, can be prevented.

Furthermore, address information of multiple gateways and information of interfaces corresponding to the gateways are stored for a single record of the routing table. Thus, it is possible to determine whether to transfer a received packet to the VPN server via the other terminal or directly transmit the packet to the VPN server.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. Non-transitory computer-readable recording medium that stores therein a computer program that causes a first terminal, which is located in a local area network (LAN), to perform a process comprising:
storing an Internet Protocol (IP) address of a second terminal forming an alliance with the first terminal where a packet is transferable without being encapsulated for IP tunneling and storing an IP address of an external terminal, which is located outside the alliance and is connected to both the first terminal and the second terminal, the IP address of the external terminal being stored in such a manner that it corresponds with the IP address of the second terminal;
receiving a packet including the IP address of the external terminal as a destination; and
transferring the packet received at the receiving to the second terminal by obtaining the IP address of the second terminal corresponding to the IP address of the external terminal stored at the storing.

2. The computer-readable recording medium according to claim 1, wherein the computer program further causes the first terminal to perform transmitting the packet via the second terminal to the external terminal.

3. The computer-readable recording medium according to claim 2, wherein the computer program further causes the first terminal to perform:
receiving the packet from the second terminal; and
transferring the packet to the external terminal.

4. The computer-readable recording medium according to claim 1, wherein the computer program further causes the first terminal to perform referring to a routing table that stores therein a source Internet Protocol (IP) address and a source netmask to transfer a packet received from the second terminal to the VPN server and a packet received from the VPN server to the second terminal.

5. The computer-readable recording medium according to claim 4, wherein the routing table stores therein address information of multiple gateways and information of multiple interfaces corresponding to the gateways with respect to a single record.

6. The computer-readable recording medium according to claim 5, wherein one of the gateways and one of the interfaces are selected stochastically.

7. The computer-readable recording medium according to claim 5, wherein one of the gateways and one of the interfaces are selected based on any one of communication bandwidth and communication delay.

8. The computer-readable recording medium according to claim 4, wherein the routing table further stores therein a destination IP address including a remote address, a global address, and a local address in the LAN.

9. Non-transitory computer-readable recording medium that stores therein a computer program that causes a virtual private network (VPN) server, which is located in a local area network (LAN), to perform a process comprising:
storing each Internet Protocol (IP) address of a first terminal and a second terminal, the first terminal and the second terminal forming an alliance where a packet is transferable without being encapsulated for IP tunneling and being connected to the VPN server;
receiving a packet including the IP address of the first terminal as a destination; and
transferring the packet received at the receiving to the second terminal by obtaining the IP address of the second terminal stored at the storing.

10. The computer-readable recording medium according to claim 9, wherein the computer program further causes the VPN server to perform referring to a routing table that stores therein a source IP address and a source netmask to transfer the packet.

11. The computer-readable recording medium according to claim 10, wherein the routing table stores therein address information of multiple gateways and information of multiple interfaces corresponding to the gateways with respect to a single record.

12. The computer-readable recording medium according to claim 11, wherein one of the gateways and one of the interfaces are selected stochastically.

13. The computer-readable recording medium according to claim 11, wherein one of the gateways and one of the interfaces are selected based on any one of communication bandwidth and communication delay.

14. The computer-readable recording medium according to claim 10, wherein the routing table further stores therein a destination IP address including a remote address, a global address, and a local address in the LAN.

15. A packet routing method executed by a first terminal, which is located in a local area network (LAN), the method comprising:
  storing an Internet Protocol (IP) address of a second terminal forming an alliance with the first terminal where a packet is transferable without being encapsulated for IP tunneling and storing an IP address of an external terminal, which is located outside the alliance and is connected to both the first terminal and the second terminal, the IP address of the external terminal being stored in such a manner that it corresponds with the IP address of the second terminal;
  receiving a packet including the IP address of the external terminal as a destination; and
  transferring the packet received at the receiving to the second terminal by obtaining the IP address of the second terminal corresponding to the IP address of the external terminal stored at the storing.

16. The packet routing method according to claim 15, further comprising the first terminal transmitting the packet via the second terminal to the external terminal.

17. The packet routing method according to claim 16, further comprising:
  the first terminal receiving the packet from the second terminal; and
  the first terminal transferring the packet to the external terminal.

18. A packet routing method executed by a virtual private network (VPN) server, which is located in a local area network (LAN), the method comprising:
  storing each Internet Protocol (IP) address of a first terminal and a second terminal, the first terminal and the second terminal forming an alliance where a packet is transferable without being encapsulated for IP tunneling and being connected to the VPN server;
  receiving a packet including the IP address of the first terminal as a destination; and
  transferring the packet received at the receiving to the second terminal by obtaining the IP address of the second terminal stored at the storing.

19. A computer system comprising:
  a first terminal and a second terminal,
  wherein the first terminal:
    stores an Internet Protocol (IP) address of the second terminal forming an alliance with the first terminal where a packet is transferable without being encapsulated for IP tunneling and stores an IP address of an external terminal, which is located outside the alliance and is connected to both the first terminal and the second terminal, the IP address of the external terminal being stored in such a manner that it corresponds with the IP address of the second terminal;
    receives a packet including the IP address of the external terminal as a destination; and
    transfers the received packet to the second terminal by obtaining the IP address of the second terminal corresponding to the stored IP address of the external terminal.

20. The computer system according to claim 19, further comprising a transmitting unit that transmits the packet via the second terminal to the external terminal.

21. The computer system according to claim 20, further comprising a second transferring unit that transfers the packet received from the second terminal to the external terminal.

22. A computer system comprising:
  a first terminal and a second terminal located in a local area network (LAN), which are connected to a virtual private network (VPN) server,
  wherein the VPN server:
    stores each Internet Protocol (IP) address of the first terminal and the second terminal, the first terminal and the second terminal forming an alliance where a packet is transferable without being encapsulated for IP tunneling;
    receives a packet including the IP address of the first terminal as a destination; and
    transfers the received packet to the second terminal by obtaining the stored IP address of the second terminal.

* * * * *